United States Patent
Ohsaki et al.

[11] Patent Number: 5,948,329
[45] Date of Patent: *Sep. 7, 1999

[54] MANUFACTURING METHOD FOR CARBON MATERIAL FOR ELECTRICAL DOUBLE LAYER CAPACITOR

[75] Inventors: Takushi Ohsaki; Akira Wakaizumi; Mitsuo Kigure; Akihiro Nakamura; Shinichi Marumo; Toshiya Miyagawa; Tadao Adachi, all of Kitakoma-gun, Japan

[73] Assignee: Nippon Sanso Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/750,845
[22] PCT Filed: Apr. 27, 1996
[86] PCT No.: PCT/JP96/01151
§ 371 Date: Dec. 24, 1996
§ 102(e) Date: Dec. 24, 1996
[87] PCT Pub. No.: WO96/34402
PCT Pub. Date: Oct. 31, 1996

[30] Foreign Application Priority Data

Apr. 27, 1995 [JP] Japan .................................. 7-104444

[51] Int. Cl.$^6$ .................................................. H01G 9/155
[52] U.S. Cl. ...................... 264/29.4; 264/29.5; 264/29.6; 264/29.7; 264/102; 264/105; 423/460
[58] Field of Search ........................... 29/25.03; 361/303, 361/305, 502, 508, 516, 528, 532; 264/29.4, 29.5, 29.6, 29.7, 101, 102, 104, 105; 423/445 R, 448, 460, 461; 252/502, 521.5

[56] References Cited

U.S. PATENT DOCUMENTS

| | | | |
|---|---|---|---|
| 2,315,346 | 3/1943 | Mitchell | 264/29.6 |
| 4,180,444 | 12/1979 | Merkl | 205/478 |
| 4,327,400 | 4/1982 | Muranaka et al. | 361/433 |
| 4,562,511 | 12/1985 | Nishino et al. | 361/324 |
| 4,702,804 | 10/1987 | Mazur et al. | 205/352 |
| 5,303,118 | 4/1994 | Saito et al. | 361/502 |
| 5,319,518 | 6/1994 | Blood | 361/502 |
| 5,381,303 | 1/1995 | Yoshida et al. | 361/502 |
| 5,430,606 | 7/1995 | Adachi et al. | 423/460 |
| 5,772,974 | 6/1998 | Ohashi et al. | 252/503 |

FOREIGN PATENT DOCUMENTS

| | | |
|---|---|---|
| 4-44407 | 5/1987 | Japan . |
| 1-242409 | 9/1989 | Japan . |
| 1-321620 | 12/1989 | Japan . |
| 2-97414 | 4/1990 | Japan . |
| 03080517 | 4/1991 | Japan . |
| 3-180013 | 8/1991 | Japan . |
| 4-70770 | 7/1992 | Japan . |
| 05094925 | 4/1993 | Japan . |
| 5-132377 | 5/1993 | Japan . |
| 5-49606 | 7/1993 | Japan . |
| 05303979 | 11/1993 | Japan . |
| 6-56827 | 7/1994 | Japan . |

*Primary Examiner*—Jan H. Silbaugh
*Assistant Examiner*—Kenneth M. Jones
*Attorney, Agent, or Firm*—Oblon, Spivak McClelland, Maier & Neustadt, P.C.

[57] ABSTRACT

It is possible to obtain at high yield a carbonaceous material suitable for carbon electrodes of electrical double layer capacitors and having superior capacitance by means of a method comprising a halogenation treatment step wherein a halogenated dry-distilled charcoal is obtained by bringing a dry-distilled charcoal into contact with a halogen gas; and by a dehalogenation treatment step wherein a part or all of the above-mentioned halogen in said halogenated dry-distilled charcoal is eliminated. In addition, it is possible to obtain carbonaceous material for electrical double layer capacitors, which has a large capacitance at rapid discharge and excellent shape, by means of conducting a molding treatment step in which a molded article is made by crushing a dry-distilled charcoal and adding a binding agent; and a carbonization treatment step in which the above-mentioned molded article is heated in an inert gas atmosphere before conducting the halogenation treatment.

10 Claims, 5 Drawing Sheets

MANUFACTURING METHOD FOR CARBON MATERIAL FOR ELECTRICAL DOUBLE LAYER CAPACITOR

TECHNICAL FIELD

The present invention relates to a carbonaceous material for use in electrodes of electrical double layer capacitors. The present invention relates to a manufacturing method for a carbon electrode and carbonaceous material having a micropore and/or sub-micropore structure in which electrolyte ions such as sulfate ions can suitably form an electrical double layer.

BACKGROUND ART

Electrical double layer capacitors are in practical use as backup power sources in electrical devices such as personal computers, and they are also under development as power sources of rapid discharge and large electric current such as auxiliary batteries for automobiles and the like. The electrodes of electrical double layer capacitors are also called polarizable electrodes and use activated carbon which is electrically conductive. Electrical double layer capacitors are used in various ways such as in situations of long term use with minute electric currents, situations of short term use with large electric currents, and in applications between these.

As the starting material for a carbonaceous material for an electrode, carbonized plant and animal material such as coal, coke, coconut shell char; any kind of resin such as phenol resin, furan resin, vinylidene chloride resin, etc. which have been heat-treated (dry-distilled) in an atmosphere of inert gas, and the like may be used. In the present invention, these starting materials are called carbon compounds in general, and materials obtained by dry-distilling carbon compounds are called dry-distilled charcoal.

As commonly used methods for obtaining activated carbon, methods in which activation treatments are conducted using an oxidizing gas such as steam, carbon dioxide gas, and air are known.

As an example of steam activation, there is Japanese Patent Application, First Publication, No. Hei 1-242409; as an example of carbon dioxide activation, there is Japanese Patent Application, First Publication, No. Hei 5-132377; as a combination method of air (oxygen) activation with steam and/or carbon dioxide activation, there is Japanese Patent Application, Second Publication, No. Hei 5-49606; and in addition, as an example of activation by means of hydroxides of sodium, potassium, and the like, there is Japanese Patent Application, First Publication, No. Hei 2-97414 (Japanese Patent Application, Second Publication, No. Hei 5-82324).

However, in normal activation treatments, the activation yield is of the level of 40~80% and the carbon loss reaches 20~60%. In addition, it is not possible to form pores of a uniform pore diameter.

Here, the activation yield takes the weight of carbon compounds before treatment as 100, and expresses the weight after treatment.

As electrical double layer capacitors which use carbonaceous material as electrodes, there are Japanese Patent Application, First Publication, No. Hei 1-321620 (carbon paste electrodes); Japanese Patent Application, First Publication, No. Hei 3-180013 (electrical double layer condensers); Japanese Patent Application, Second Publication, No. Hei 6-56827 (polarizable electrodes and manufacturing method); Japanese Patent Application, Second Publication, No. Hei 4-44407 (electrical double layer capacitor); and Japanese Patent Application, Second Publication, No. Hei 4-70770 (electrical double layer capacitor).

Japanese Patent Application, Second Publication, No. Hei 4-44407 discloses an electrical double layer capacitor which uses, as a polarizable electrode, an activated carbon obtained by preparing a phenol resin foam from phenol resin, polyvinyl alcohol and starch, and then conducting an activation treatment thereon. Since a porous activated carbon having a specific surface area of 2000 $m^2/g$ or greater is obtained, it is possible to make a carbon electrode for an electrical double layer capacitor of large capacity.

Japanese Patent Application, Second Publication, No. Hei 4-70770 discloses that when the average pore diameter of an activated carbon is made 15 Å or greater, a carbon electrode having good temperature characteristics is obtained.

Japanese Patent Application, First Publication, No. Hei 3-180013 discloses that by making the oxygen content of a powdered activated carbon 20~35% by weight, the capacitance per unit of volume is increased.

Conventionally, the electrodes of electrical double layer capacitors use powdered activated carbon base material which has been made into a paste by mixing with a sulfuric acid solution, but the contact resistance between the particles of activated carbon is large, and large electrical currents cannot flow. In addition, in the same way, when fibrous activated carbon is used, the contact resistance between the fibers is large, the density of carbon per unit of volume is small, and it is not possible to obtain large electrical currents.

The structure of the carbonaceous material can take various forms depending on the starting material and the manufacturing method.

Char and activated carbon obtained by activating char comprise microcrystalline carbon (crystallite), and carbon which takes on a chain structure. When the carbonaceous material is a nongraphitizing carbon, the crystallites take on a structure which is layered in a disorderly manner, and a wide range of pores, from micropores to macropores, are formed in the gaps between these crystallites.

The crystallites are layers of net planes of six membered carbon rings of several parallel layers, and graphite carbon which has a six membered carbon ring structure bonds using hybridized orbitals $SP^2$. A net plane comprising six membered ring carbon is called a basal plane.

A graphitizing carbon develops crystallites by means of heating at a high temperature, and finally becomes graphite.

A nongraphitizing carbon usually contains unorganized carbon. Unorganized carbon is carbon other than graphite carbon which is chemically bonded to graphite carbon only; carbon which has a chain structure; carbon which is stuck around six membered ring carbon; carbon which is in the periphery (the prism plane) of six membered ring carbon; carbon which is held in cross-linked structures with other six membered carbon rings (crystallites), and the like. Unorganized carbon is bonded with oxygen atoms, hydrogen atoms, and the like in forms such as C—H, C—OH, C—OOH, and C=O; or is in the form of double bonded carbon (—C=C—).

When pores have a diameter of 8 Å or less, they are called sub-micropores, when they have a diameter in the range of 8~20 Å, they are called micropores. Pore diameters within these spheres are approximately of the same order as the diameter of electrolyte ions, and therefore these pores are believed to take part in the formation of electrical double layers. Because present measuring techniques are unable to directly observe the pore structure of pores in the submicropore range, the situation at present is such that it is not possible to establish this as a general theory.

However, in conventional manufacturing methods for carbonaceous material for electrical double layer capacitors, since micropores and/or sub micropores are not sufficiently developed, the storage capacity for electrochemical energy is small, and capacitance is not sufficient. In addition, there is the problem that the carbon yield is low. In addition, efficiency for rapid discharge is unsatisfactory.

DISCLOSURE OF THE INVENTION

An object of the present invention is the provision of a method for manufacturing, at a high carbon yield, carbonaceous material which is suitable for use in carbon electrodes for electrical double layer capacitors, and which has excellent capacitance. In addition, an object of the present invention is the provision of carbonaceous material for electrical double layer capacitors which has large capacitance at rapid discharge.

A first aspect of the present invention is a manufacturing method for a carbonaceous material for an electrical double layer capacitor characterized by a halogenation treatment step in which a halogenated dry-distilled charcoal is obtained by bringing dry-distilled charcoal into contact with halogen gas; and a dehalogenation treatment step in which a part or all of the halogen in the above-mentioned halogenated dry-distilled charcoal is eliminated.

In the above-mentioned first aspect, the above-mentioned halogen gas may include at least one halogen selected from the group consisting of chlorine and bromine.

In addition, in the above-mentioned first aspect, the above-mentioned halogenation treatment may be a heat treatment at a temperature of 350~1000° C. in a halogen gas diluted with an inert gas.

In addition, in the above-mentioned first aspect, the above-mentioned dehalogenation treatment may be a heat treatment at a temperature of 500~1200° C. under reduced pressure.

In addition, in the above-mentioned first aspect, the above-mentioned dehalogenation treatment may be a heat treatment at a temperature of 500~1200° C. in an inert gas.

In addition, in the above-mentioned first aspect, the above-mentioned dry-distilled charcoal may be a dry-distilled charcoal obtained by dry-distilling at least one substance selected from the group comprising coconut shell, phenol resin, furan resin, and vinylidene chloride resin.

In addition, in the above-mentioned first aspect, the above-mentioned dehalogenation treatment may be a heat treatment at a temperature of 600~850° C. in a hydrogen compound gas which has been diluted with an inert gas. The above-mentioned hydrogen compound may include at least one compound selected from the group consisting of water and lower hydrocarbons.

In addition, in the above-mentioned first aspect, before the above-mentioned halogenation treatment, a molding treatment step in which a molded article is made by crushing the dry-distilled charcoal and adding a binding agent; and a carbonization treatment step in which the above-mentioned molded article is heated in an inert gas atmosphere may be conducted. This binding agent may be a composition which contains phenol resin powder, organic solvent, and lipophilic solvent. In addition, the above-mentioned carbonization treatment may be a treatment which comprises a step in which the temperature is raised at a rate of 20~500° C./h, and heating conducted at 400~1000° C.

A second aspect of the present invention is a carbon electrode for an electrical double layer capacitor characterized by being obtained by crushing a carbonaceous material for a capacitor obtained by means of the manufacturing method of the above-mentioned first aspect, adding sulfuric acid to this crushed carbonaceous material, and then kneading it.

This carbon electrode for an electrical double layer capacitor may be obtained by impregnating the carbonaceous material for a capacitor, obtained by conducting a halogenation treatment and a dehalogenation treatment on the above-mentioned molded article, with sulfuric acid.

The carbon electrode for an electrical double layer capacitor of the above-mentioned second aspect can be a carbon electrode which has a capacitance of 55~85 F/cm$^3$ when discharging at a constant electrical current of from 540 mV to 360 mV at 4 mA/cm$^2$ using sulfate ions as electrolyte ions.

The carbon electrode for an electrical double layer capacitor obtained from the above-mentioned molded article can be a carbon electrode which has a capacitance of 30~50 F/cm$^3$ when discharging a constant electrical current of from 540 mV to 360 mV at 300 mA/cm$^2$ using sulfate ions as the electrolyte ions.

A third aspect of the present invention is an electrical double layer capacitor which is characterized by having a carbon electrode according to the above-mentioned second aspect.

THE BEST MODE FOR CARRYING OUT THE INVENTION

In the following description, the explanation is made using chlorine gas as the main example of the halogen gas used in the halogenation treatment; however, using the same technical concept, other halogen gases such as bromine may be used.

Figure 1:
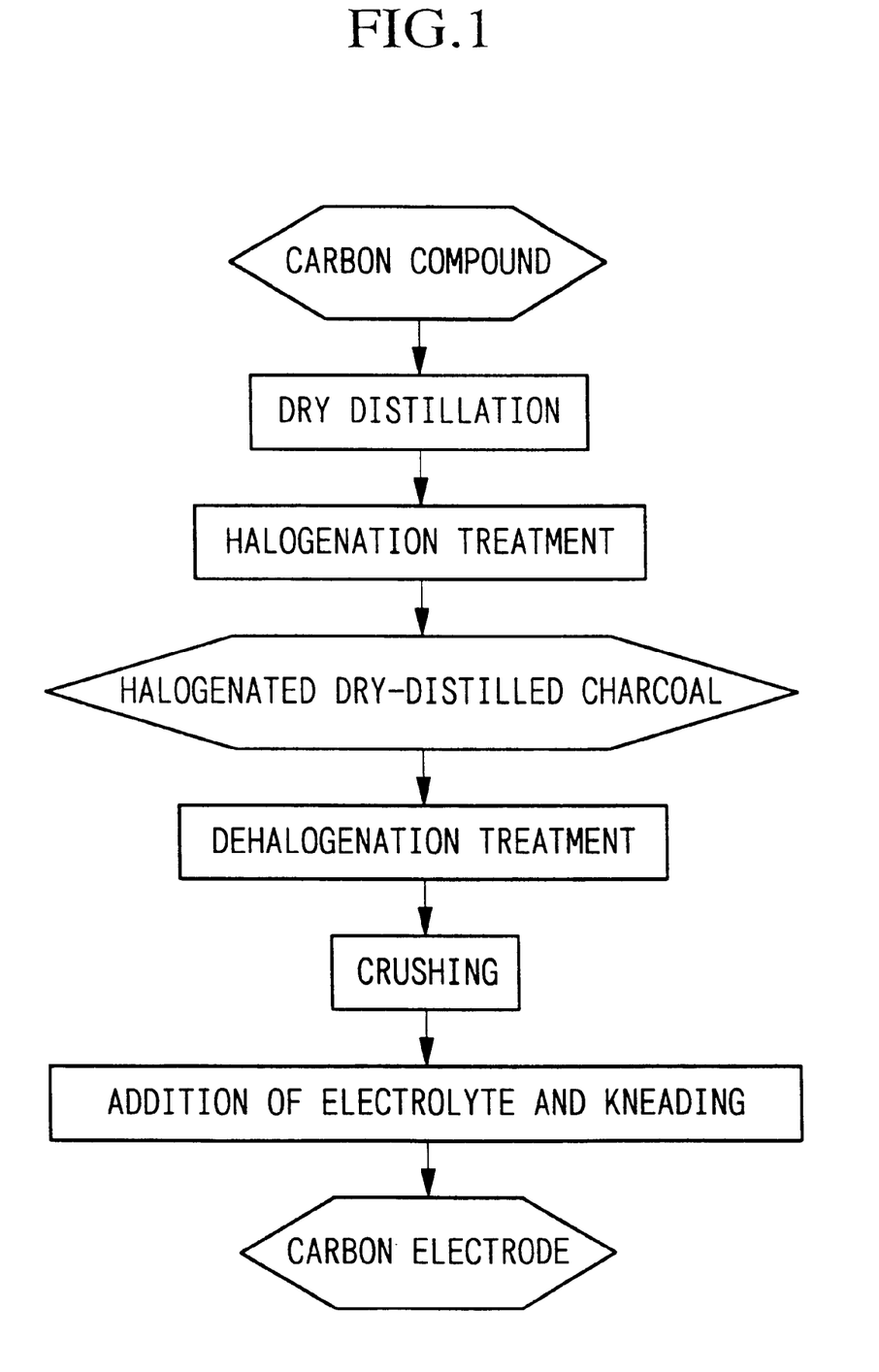
FIG. 1 is a process diagram of a manufacturing method for an electrode and a carbon for an electrical double layer capacitor according to the present invention.
Figure 2:
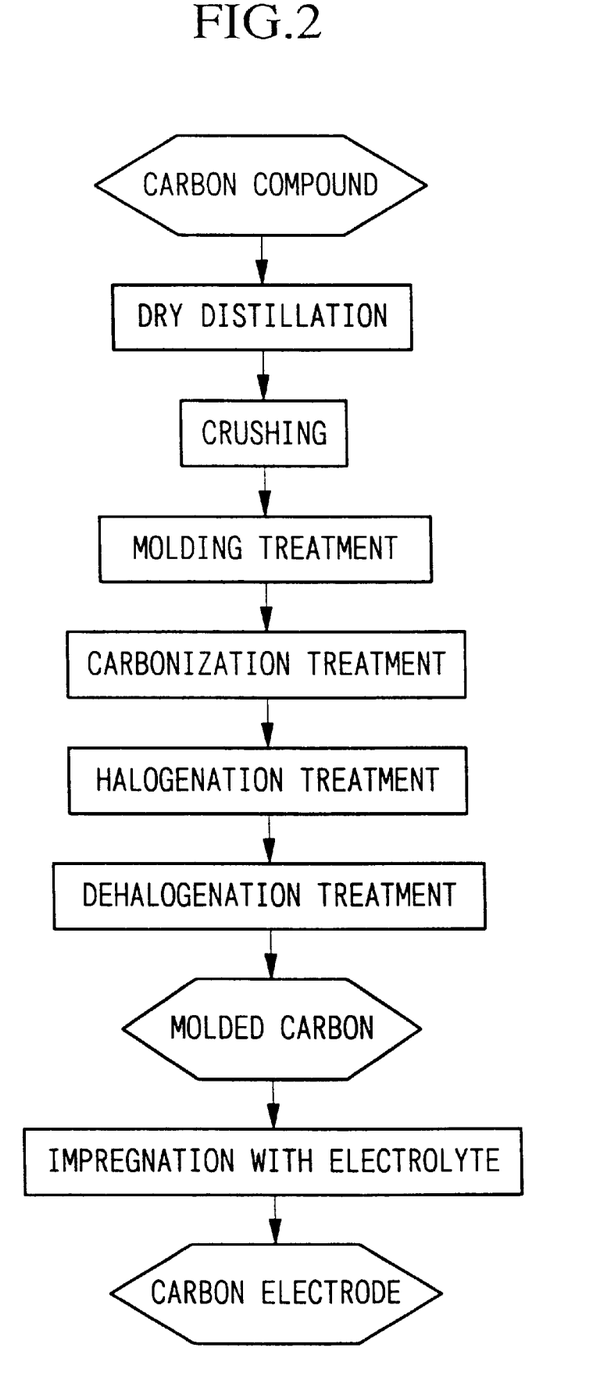
FIG. 2 is a process diagram of another manufacturing method for an electrode and a carbon for an electrical double layer capacitor according to the present invention.

FIG. 1 shows an outline of a manufacturing process for an electrode and a powdered carbonaceous material for an electrical double layer capacitor according to one embodiment of the present invention. In addition, FIG. 2 shows an outline of a manufacturing process for an electrode and a molded carbonaceous material for an electrical double layer capacitor according to another embodiment of the present invention.

A manufacturing method for the carbonaceous material for an electrical double layer capacitor according to the present invention comprises conducting a halogen treatment on a dry-distilled charcoal. The halogen treatment of the present invention comprises a halogenation treatment in which halogenated dry-distilled charcoal is obtained by bringing dry-distilled charcoal into contact with halogen gas; and thereafter, a dehalogenation treatment in which a part or all of the halogen of the halogenated dry-distilled charcoal is eliminated.

Using chlorine as an example, the degree of chlorination of the chlorinated dry-distilled charcoal is expressed by the atomic ratio of chlorine to carbon (Cl/C). This atomic ratio is calculated by dividing the number of chlorine atoms by the number of carbon atoms, wherein the number of carbon atoms is calculated by taking the weight of the dry-distilled charcoal before the chlorination treatment to be the weight of carbon, and the number of chlorine atoms is calculated by taking the weight increase due to the chlorination treatment to be the weight of chlorine. In addition, the degree of dechlorination is expressed by the atomic ratio of the chlorine which remains after the dechlorination treatment to the carbon. This atomic ratio is calculated by taking the weight decrease due to the dechlorination treatment to be the decrease in chlorine, converting this to the number of atoms, subtracting this value from the number of chlorine atoms of the chlorinated dry-distilled charcoal, and dividing this value by the number of carbon atoms before the chlorination treatment.

When bromine is used as the halogen gas, the atomic ratio (Br/C) is also calculated in the same way as for chlorine mentioned above.

In real halogen treatments, due to the activating action of steam (the gasification of carbon), the dry-distillation action accompanying the progress of carbonization, and the like, the ratio of the number of atoms according to the above definition may be a negative value.

Halogenation Treatment

The chlorination treatment may be a treatment in which dry-distilled charcoal is heated at a temperature of 350~1000° C. and preferably at 400~800° C. in chlorine gas which has been diluted with an inert gas, such as nitrogen.

When the temperature of the heat treatment of the chlorination treatment exceeds 1000° C., due to the reduction in the quantity of hydrogen atoms as dry distillation progresses, the degree of chlorination is reduced, and, therefore, this is not desirable. In addition, when the temperature of the heating of the chlorination treatment is less than 350° C., because the reaction speed of the unorganized carbon and the chlorine is too slow, a long period of time is required for the chlorination treatment, and, therefore, this is not desirable.

With regard to the supply rate for the chlorine gas, when the concentration of the chlorine gas is 10% by volume, the superficial velocity in the column is of the level of 0.2~0.3 L/(min.cm$^2$) (L is the volume of the gas at approximately atmospheric pressure and room temperature; this is the same hereinafter). The time for the chlorination treatment is approximately 30 minutes when in the high temperature region of the above-mentioned temperature range; however, approximately 120 minutes are required when in the low temperature range close to 400° C.

When a bromination treatment is conducted as the halogenation treatment, other than using bromine gas in place of chlorine gas, the treatment may be conducted under the same conditions as above.

In the chlorine treatment, in the main, since hydrogen atoms in the dry-distilled charcoal are replaced by chlorine atoms, hydrogen chloride (HCl) is detected in the exhaust gas. In the same way, in the bromination treatment, hydrogen bromide (HBr) is detected.

By means of the above-mentioned chlorination treatment, a chlorinated dry-distilled charcoal is obtained which has an atomic ratio of chlorine to carbon of preferably 0.03 or greater, and more preferably of 0.07 or greater. Moreover, when this atomic ratio is less than 0.03, the contribution to the formation of the micropores is small, therefore, this is not desirable.

In addition, the upper limit of the above-mentioned atomic ratio is determined by the dry-distillation temperature and the quantity of hydrogen atoms in the dry-distilled charcoal; however, it is understood that the desired results of the present invention may be obtained at 0.315 or less.

In the bromination treatment, even when the atomic ratio of bromine to carbon (Br/C) approaches 0.01, the effects of the present invention may be obtained.

Dehalogenation Treatment

The dehalogenation treatment is a treatment in which a high temperature dehalogenation and a low temperature dehalogenation may be successively conducted.

When conducting the dechlorination treatment, with regard to the degree of dechlorination, the above-mentioned atomic ratio (Cl/C) is preferably 0.02 or less, but it is not necessary for the chlorine to be completely eliminated. In addition, when conducting a debromination treatment, with regard to the degree of debromination, the atomic ratio (Br/C) is preferably 0.01 or less, but it is not necessary for the bromine to be completely eliminated.

During the dechlorination treatment, since the chlorine in the dry-distilled charcoal is eliminated mainly as hydrogen chloride, hydrogen chloride is detected in the exhaust gas. In the same way, during the debromination treatment, hydrogen bromide is detected.

The high temperature dechlorination treatment may be a heat treatment under vacuum evacuation or in an inert gas at a temperature of 500~1200° C., and preferably at 600~1000° C. The degree of vacuum evacuation is not particularly limited, and vacuum evacuation approaching 10 mmHg is sufficient. A time of 20~30 minutes is sufficient for the heat treatment.

When a high temperature dechlorination treatment conducted in inert gas is conducted at treatment temperatures exceeding 1200° C., the openings of the fine pores become too small due to heat shrinkage and sulfate ions cannot enter inside the fine pores, therefore, the desired amount of capacitance cannot be obtained. In addition, when a high temperature dechlorination treatment is conducted at temperatures lower than 500° C., chlorine cannot be sufficiently eliminated.

Moreover, in the high temperature dechlorination treatment, the chlorine in the dry-distilled charcoal is not completely dechlorinated, and some part remains.

The high temperature debromination treatment can also be conducted under the same conditions as the above-mentioned high temperature dechlorination treatment. After the high temperature debromination treatment, the bromine in the dry-distilled charcoal is not completely eliminated, and some part remains.

The low temperature dechlorination treatment may be a heat treatment at a temperature of 600~850° C., and preferably 650~750° C., in a hydrogen compound gas or in a hydrogen compound gas which has been diluted with an inert gas. A heat treatment time of 20~30 minutes is sufficient.

In the low temperature dechlorination treatment, the chlorine in the dry-distilled charcoal is almost completely eliminated.

Here, the hydrogen compound gas is steam ($H_2O$); hydrogen; lower hydrocarbons, such as methane ($CH_4$), ethane ($C_2H_6$), ethylene ($C_2H_4$), propane ($C_3H_8$), propylene ($C_3H_6$), butane ($C_4H_{10}$), and butylene ($C_4H_8$); and mixtures of these gases. As a hydrogen compound gas in an inert gas, the exhaust gas of LPG (liquid petroleum gas) which has been incompletely burned is suitable for industrial use. The composition of the above-mentioned exhaust gas is, for example, steam: 13~17% by volume; carbon dioxide: 9~12% by volume; carbon monoxide: 0.01~1% by volume; nitrogen: 68~74% by volume; and unburned lower hydrocarbons: 0.01~3% by volume.

When the above-mentioned hydrogen compound is steam, the concentration of the steam is not particularly limited; however, when the superficial velocity in the column is from 0.05 to 0.15 L/(min.cm$^2$), 3% by volume is sufficient.

Furthermore, when the above-mentioned hydrogen compound is steam, and the heat treatment is carried out at a temperature exceeding 850° C., since activation effects due to the steam progress too far, the formation of micropores is obstructed, the carbon yield is reduced, and the effects of the present invention are reduced. Moreover, when the above-mentioned hydrogen compound is hydrogen gas, since there are no activation effects, there is no restriction for the upper temperature limit.

The low temperature debromination treatment can also be conducted under the same conditions as the above-mentioned low temperature dechlorination treatment. In the low temperature dechlorination treatment, the bromine in the dry-distilled charcoal is almost completely eliminated.

There are five treatment methods for dehalogenation: methods in which only a high temperature dehalogenation treatment is conducted; methods in which only a low temperature dehalogenation treatment is conducted; treatments which are combinations of these methods in which a high temperature dehalogenation treatment and a low temperature dehalogenation treatment are successively conducted; treatments in which a low temperature dehalogenation treatment and a high temperature dehalogenation treatment are successively conducted; and treatments in which a high temperature dehalogenation treatment, a low temperature dehalogenation treatment, and a high temperature dehalogenation treatment are successively conducted. These are shown in Table 1.

TABLE 1

Five Treatment Methods for Dehalogenation Treatment

| | | |
|---|---|---|
| 1) High Temperature Dehalogenation Treatment: | heat treatment under vacuum evacuation or in inert gas | |
| 2) Low Temperature Dehalogenation Treatment: | heat treatment in hydrogen compound gas or in hydrogen compound gas diluted with inert gas | |
| 3) High Temperature Dehalogenation Treatment | → Low Temperature Dehalogenation Treatment | |
| 4) Low Temperature Dehalogenation Treatment | → High Temperature Dehalogenation Treatment | |
| 5) High Temperature Dehalogenation Treatment | → Low Temperature Dehalogenation Treatment | → High Temperature Dehalogenation Treatment |

Among the treatment methods for dehalogenation explained above, when a treatment in which a high temperature dehalogenation treatment and a low temperature dehalogenation treatment are successively conducted is adopted using a hydrogen compound, steam, or a mixture of steam and a lower hydrocarbon, the effects of the present invention become even more apparent.

Molding Treatment

The crushing of dry-distilled charcoal or halogenated dry-distilled charcoal can be conducted by means of generally used devices. The average size of the crushed particles may be from several $\mu$m to several tens of $\mu$m.

As the binding agent used for molding, phenol resin powder dissolved in an organic solvent (such as an alcohol, a ketone such as acetone, or the like), and a lipophilic solvent (such as creosote oil, coal tar, anthracene oil, kerosene oil, liquid paraffin, ethylene glycol, glycerin, or the like) can be used. The molding can be done using equipment which is used in conventional techniques.

Carbonization Treatment

The carbonization treatment for the molded article of the molding treatment is a heat treatment conducted under a nitrogen gas flow with a rate of temperature increase of 20~500° C./h, and preferable 50~400° C./h, and conducted at a temperature of 400~1000° C., and preferably 450~800° C., for a period of 10 minutes to 8 hours, and preferably 30 minutes to 4 hours.

When the rate of temperature increase is too slow, the treatment time is long and the effectiveness is low, when it is too fast, deformation (swelling/warp) and damage (chips/cracks/peeling) develop in the molded carbon, and suitable shape cannot be obtained. When the heating temperature is less than 400° C., carbonization is insufficient, and when it is higher than 1000° C., the formation of pore structure is badly effected.

The molded carbonaceous material in the present invention is a carbonaceous material which has a carbon structure condition in which the carbon base material and the above-mentioned binding agent are made unitary by conducting the carbonization treatment or the halogen treatment.

The above-mentioned manufacturing method for a carbonaceous material for an electrode can be applied to various dry-distilled charcoals, but, in particular, dry-distilled charcoal obtained by dry-distilling coconut shell, phenol resin, furan resin, or vinylidene chloride resin is excellent as a starting material.

Manufacture of the Electrode

In one embodiment of the present invention, the carbonaceous material obtained by successively conducting the above-mentioned halogenation treatment and dehalogenation treatment is crushed to a particle size of preferably several $\mu$M or less. This crushing may be conducted by means of one of the crushing methods known in the relevant field such as a dry method, a wet crushing method in which solvent is added, or the like. In addition, after applying dry type crushing, electrolytic solution may be added, and while wet type crushing, kneading may be conducted.

A uniform carbon electrode can be made by adding electrolytic solution to the crushed carbonaceous material and kneading. As this electrolyte, an electrolyte which is known in the relevant field may be used, and preferably sulfuric acid or the like is used. The amount of the electrolytic solution added to the crushed carbonaceous material is generally set in such a way as to obtain a paste of carbon electrode material; however, it is also possible to increase or decrease the amount of electrolytic solution so as to obtain a liquid or a solid carbon electrode material.

In addition, in another embodiment of the present invention, when manufacturing a carbon electrode using molded carbonaceous material which has been given a halogen treatment, the electrode can be made by immersing the carbonaceous material, which has been cut to the desired shape, in electrolytic solution. In this case, it is preferable to immerse the carbonaceous material in electrolytic solution while in a vacuum or under reduce atmosphere because the electrolytic solution can penetrate into the inner parts of the carbonaceous material.

The carbon electrode for electrical double layer capacitors which uses this chlorine-treated powdered carbonaceous material can be a carbon electrode which has a capacitance of 55~85 F/cm$^3$ when discharging at a constant electric current of from 540 mV to 360 mV at 4 mA/cm$^2$ using sulfate ions as the electrolyte ions. Here, F represents Farads, and cm$^3$ represents the volume of the carbon electrodes (the total of the positive and negative electrodes).

In the same way, the carbon electrode f or electrical double layer capacitors which uses bromine-treated powdered carbonaceous material can be a carbon electrode which has a capacitance of 55~85 F/cm$^3$ when discharging at a constant electric current of from 540 mV to 360 mV at 4 mA/cm$^2$ using sulfate ions as the electrolyte ions.

The carbon electrode for electrical double layer capacitors which uses this chlorine-treated molded carbonaceous material can be a carbon electrode which has a capacitance of 30~50 F/cm$^3$ when discharging at a constant electric current of from 540 mV to 360 mV at 300 mA/cm$^2$ using sulfate ions as the electrolyte ions of the electrical double layer capacitor.

In the same way, the carbon electrode for electrical double layer capacitors which uses bromine-treated molded carbonaceous material can be a carbon electrode which has a capacitance of 30~50 F/cm$^3$ when discharging at a constant electric current of from 540 mV to 360 mV at 300 mA/cm$^2$ using sulfate ions as the electrolyte ions of the electrical double layer capacitor.

As the electrolyte, aqueous solutions such as sulfuric acid ($H_2SO_4$), potassium hydroxide (KOH), hydrochloric acid (HCl), and sodium sulfate ($Na_2SO_4$) can be used. In addition, tetraethylammonium perchlorate, tetraethylammonium fluoroborate, lithium perchlorate, alkali metal salts, amine salts, tetraalkylammonium salts, tetraalkylphosphonium salts, and the like dissolved in a solvent such as polypropylene carbonate, γ-butyllactone, acetonitrile, dimethylformamide, 1,2-dimethoxyethane, sulfolane, nitromethane, or the like can be used.

In the following the functions of the present invention are explained.

Halogen Treatment

The structure of the carbonaceous material can take various forms depending on the starting material and the manufacturing method.

Char and activated carbon obtained by activating char comprise microcrystalline carbon (crystallite), and carbon which takes on a chain structure. When the carbonaceous material is a nongraphitizing carbon, the crystallites take on a structure which is layered in a disorderly manner, and a wide range of pores, from micropores to macropores, are formed in the gaps between these crystallites.

The crystallites are layers of net planes of six membered carbon rings of several parallel layers, and graphite carbon which has a six membered carbon ring structure bonds using hybridized orbitals $SP^2$. A net plane comprising six membered ring carbon is called a basal plane.

A nongraphitizing carbon usually contains unorganized carbon. Unorganized carbon is carbon other than graphite carbon which is chemically bonded to graphite carbon only; carbon which has a chain structure; carbon which is stuck around six membered ring carbon; carbon which is in the periphery (the prism plane) of six membered ring carbon; carbon which is held in cross-linked structures with other six membered carbon rings (crystallites), and the like.

When chlorine gas is brought into contact with dry-distilled charcoal, the chlorine reacts with unorganized carbon. In these reactions, there are addition reactions of chlorine to double bonded carbons, exchange reactions of chlorine atoms for hydrogen atoms which are bonded to the unorganized carbon (hydrogen chloride in a molar equivalent to chlorine is generated), dehydrogenation reactions (hydrogen chloride twice that of the chlorine is generated), and so on.

At the time of the above-mentioned chlorine reactions and at the time of the dechlorination reactions, the reaction shown in the following formula occurs, and it is believed that new bonds between carbons (hereinafter, carbon bonds) are formed (The mark C| represents unorganized carbon).

Moreover, when bromine is brought into contact with dry-distilled charcoal, with the exception that bromine takes part in the reaction in place of chlorine, it is believed that carbon bonds are formed by means of a reaction the same as that mentioned above.

By means of the formation of these new carbon bonds, actions such as the action of repairing defects in the polyaromatic ring structure of the crystallites or the carbon net planes, the action of growth of the crystallites, and the action of changes in the aggregation condition of crystallites are believed to take place, but these details are unclear. However, by means of these actions, it is believed that a large number of micropore and/or sub-micropore structures are formed in which electrolyte ions such as sulfate ions can suitably form electrical double layers.

Molded Article

For paste form electrical double layer capacitors obtained by the addition of a pasting agent to powdered carbonaceous material which has not been given a halogen treatment, the capacitance of the portion which has not been given a halogen treatment is small. In addition, the pasting agent does not contribute to charging or discharging, therefore, the capacitance for each part by weight of carbon or for each unit of volume of electrode is small.

In contrast, another embodiment of the present invention uses a carbonaceous powder which has been given a halogen treatment, therefore, the shape of the electric double layer is improved, and, in particular, it is excellent when used at minute electrical current discharges. However, in paste form electrodes in which a pasting agent has been added to a powder, because of the aggregation of powder, electrical resistance is high, therefore, the capacitance when applied to rapid discharge is insufficient.

In another embodiment of the present invention, in addition to the binding agent being carbonized, it is given a halogenation treatment, therefore, the whole molded article contributes to electrical charging and discharging, and since resistance is small, even for rapid discharge, large capacitance can be obtained.

In the carbonization treatment, a gasified component is generated by the carbonization of the binding agent added in the molding treatment, and this gasified component moves from the inside of the molded article to the outside. Consequently, if the temperature increase is too rapid, the rate of generation of gas is high, and this causes the generation of variation and damage in the molded article, therefore, it is preferable that the rate of temperature increase not be too fast.

In the following, the present invention is explained specifically and in detail based on Examples and Comparative Examples.

Dry-distilled Charcoal Starting Materials

In the Examples, the dry-distilled charcoal starting material and its manufacturing method are indicated by the following terms.

Dry-distilled Charcoal A is Philippine coconut shell char which has been finely crushed (crusher: Model MB-1 manufactured by Chuo Kakouki Co. (Ltd)), made into pellets (pelletizer: Model PV-5 manufactured by Fuji Powdal (Ltd)) of 2 mm φ×5~6 mm using coal tar as a binder, and then dry-distilled at 600° C. under a nitrogen gas current.

Dry-distilled Charcoal B is phenol resin (PGA-4560, product name: Resitop, manufactured by Gun-ei Chemical Industry (Ltd)) which ha s been hardened at 160° C., finely crushed, then made into pellets of 2 mm φ×5~6 mm using Resitop as a binder, and dry-distilled at 600° C. under a nitrogen gas current.

Dry-distilled Charcoal C is furan resin (VF-302 manufactured by Hitachi Chemical Co. (Ltd)) which, after being hardened by the addition of a hardening agent, has undergone dry distillation at 550° C., been finely crushed, then made into pellets of 2 mm φ×5~6 mm using coal tar as a binder, and dry-distilled at 550° C. under a nitrogen gas atmosphere.

Dry-distilled Charcoal D is vinylidene chloride resin (commercial product name is Saran wrap) which has undergone dry distillation at a temperature of 550° C. under a nitrogen gas current, been finely crushed, then made into pellets of 2 mm φ×5~6 mm using Resitop as a binder, and dry-distilled at 550° C. under a nitrogen gas atmosphere.

Molding Treatment

Dry-distilled charcoal is crushed for approximately 60 minutes in a vibrating ball mill (NB-0 manufactured by Nitto Kagaku (Ltd)). The average particle size of the obtained carbon powder is about 8 μm.

To 100 parts by weight of crushed dry-distilled charcoal powder, 15 parts by weight of phenol resin as a binding agent, 8 parts by weight of ethanol, and 20 parts by weight of creosote were added and kneaded, and then molded into sheets of 50×50×1 (mm) by pressing at a pressure of 500 kgf/cm². The weight of the molded product was about 2.5~3 g for 1 sheet.

Carbonization Treatment

The carbonization treatment conducted after the molding treatment was conducted under a nitrogen gas current, heating at a temperature which was increased at a rate of 100~200° C./h, and then maintaining at a temperature of 550~700° C. for approximately 30 minutes.

Equipment for the Halogen Treatment, and the Carbonization Treatment

Figure 3:
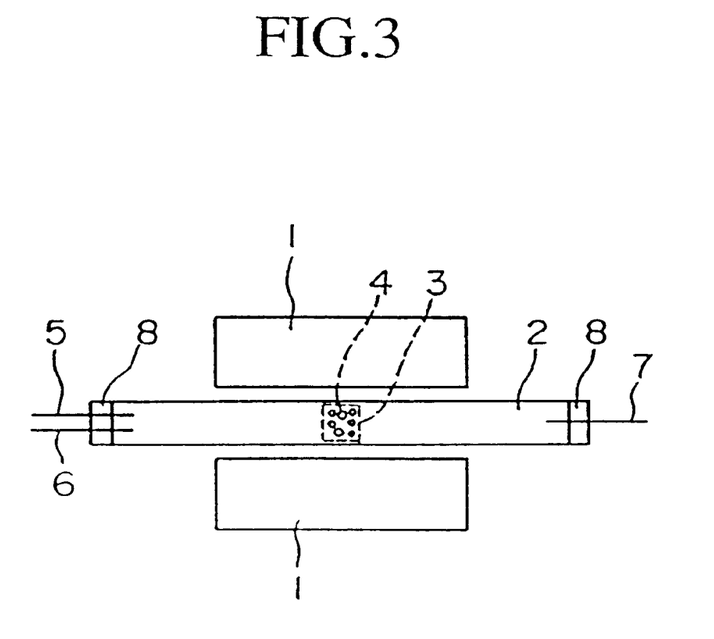
FIG. 3 is an outline diagram of the halogen treatment equipment.

An outline of the equipment for conducting the halogen treatment and the carbonization treatment for putting the present invention into practice is shown in FIG. 3. Explanation is made using a chlorine treatment as an example, however, a bromine treatment can be done in the same way. In FIG. 3, 1 is a pipe shaped electric kiln which is equipped with a temperature control device (the pipe shaped kiln is manufactured by Yoshida Seisakusho, the temperature control device is a thermocouple, JIS R, Model SU manufactured by Chino); 2 is a quartz pipe; 3 is a container (gas permeable) for carbonaceous material; 4 is a carbonaceous material; 5 is a nitrogen gas supply pipe; 6 is a supply pipe for chlorine, bromine, steam, methane, and the like; 7 is an exhaust gas outlet pipe; and 8 is a rubber stopper. The supplying pressure for each gas was approximately atmospheric pressure.

In the chlorination treatment, nitrogen gas flows at a predetermined rate from pipe 5, and chlorine gas flows at a predetermined rate from pipe 6. In the high temperature dechlorination treatment, nitrogen gas flows from pipe 6 at a predetermined rate. In the low temperature dechlorination treatment, nitrogen gas flows from pipe 5 at a predetermined rate; and nitrogen gas containing steam, methane, or the like flows from pipe 6 at a predetermined rate. In the carbonization treatment, nitrogen gas flows from pipe 5 at a predetermined rate. The flow rate is measured by a float-type flowmeter (chlorine gas: PGF-N model manufactured by Ryutai Kogyo (Ltd)); other gases: ST-4 model manufactured by Nippon Flowcell Co.).

Measurement of the Weight, Specific Surface Area, and Pore Volume

Weight was measured using an electric balance (LIBROR EB- 430HW manufactured by Shimadzu Co.).

The specific surface area was calculated from the Brunauer-Emmett-Teller adsorption equation after measuring the amount of nitrogen gas adsorbed at −196° C. (the temperature at which liquid nitrogen boils). The measurement equipment used an Accusorb 2100-02 model manufactured by Shimadzu Co.

The pore volume was calculated as a value of the amount of benzene adsorbed (g Benzene/g Carbon) divided by the density of liquid benzene (0.879 g/cm³).

Measurement of Capacitance

When the electrode is manufactured from powdered carbonaceous material, chlorine-treated dry-distilled charcoal is crushed for approximately 60 minutes by a vibrating ball mill (NB-0 manufactured by Nitto Kagaku (Ltd)). The average particle size of the obtained carbon powder is about 8 μm. A paste is made by adding 30% sulfuric acid to this powdered carbon and then two electrodes are made by placing this paste in a mold which is formed by hollowing out a disc of 25 mm in diameter and 2 mm in depth. The thickness of the carbon electrodes is 2 mm. However, in Example 7 (powdered carbonaceous material), the electrodes having the shape of 14 mm in diameter and 1 mm in depth is used.

When the electrodes are manufactured from molded carbon, electrodes of two round discs having a diameter of 14 mm a thickness of 1 mm are cut out from a suitable molded carbon which has been given a chlorine treatment, and then impregnated with 30% by weight sulfuric acid solution at reduced pressure.

The sulfuric acid solution impregnated substance is called a carbon electrode. In contrast to this, the powdered or molded carbon before it is made into a carbon electrode is called carbonaceous material for an electrical double layer capacitor.

Figure 4:
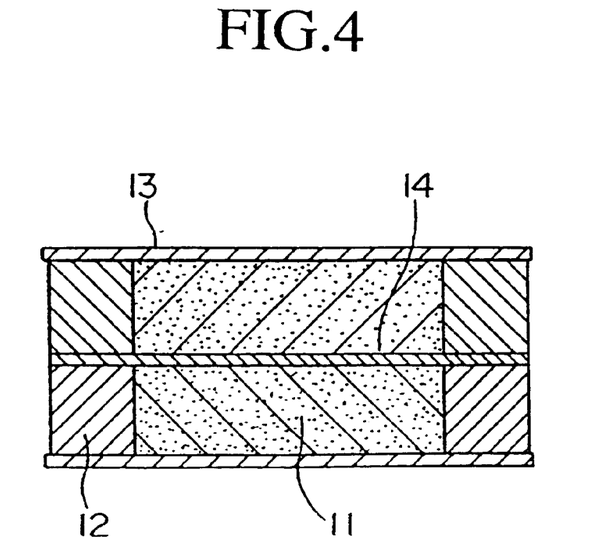
FIG. 4 is a cross-sectional outline diagram of a capacitance measurement cell.

The measuring cell shown in FIG. 4 is made by layering these two electrodes so as to face each other, a polypropylene separator being sandwiched therebetween, and sandwiching them on both sides between platinum collecting electrodes. Using the measuring cell, the capacitance is measured. In FIG. 2, reference 11 is a carbon electrode, 12 is a gasket, 13 is a collecting electrode, and 14 is a separator. In general, capacitance C (unit: Farads, F) can be calculated from $C = I \times \Delta t/(V_1 - V_2)$, by charging at a certain voltage, and measuring the time $\Delta t$ (s) for the reduction in the voltage from $V_1$ to $V_2$ (V) due to discharging at a constant current I (A).

Situations in which the discharge current I is small are referred to as moderate discharge, and the value for capacitance is a large value. Situations in which the discharge current I is large are referred to as rapid discharge, and the capacitance has a small value. Situations in which the discharge current is 300 mA/cm² are rapid discharge. cm² is the cross-sectional area of the carbon electrode.

Electrodes manufactured from the powdered carbonaceous material of the present invention were charged for 24 hours at 900 mV, then discharged at a constant current of I=4 mA/cm², the time for the voltage to decrease from $V_1$=540 mV to $V_2$=360 mV was measured, and the capacitance calculated.

In addition, electrodes manufactured from the molded carbonaceous material of the present invention were charged for 24 hours at 900 mV, then discharged at a constant current of I=300 mA/cm²; $V_1$ was 540 mV and $V_2$ was 360 mV.

Comparative Example 1
Carbon Dioxide Gas Activation, Powder

Dry-distilled Charcoal B was heat-treated (15 minutes) at 900° C. and then carbon dioxide gas activated (in an atmosphere of carbon dioxide gas) at a temperature of 900° C. Four types of specimen were manufactured with activation times of (1): 110 minutes (activation yield of 81.0%); (2): 190 minutes (activation yield of 69.6%); (3): 300 minutes (activation yield of 57.5%); and (4): 345 minutes (activation yield of 50.9%) (activation yield=the dry-distilled charcoal weight after activation÷the dry-distilled charcoal weight before activation). The specific surface areas of the four types of specimens were (1): 990 m²/g; (2): 1370 m²/g; (3) 1750 m²/g; and (4): 1920 m²/g. In addition, the pore volumes were (1): 0.33 cm³/g; (2): 0.45 cm³/g; (3): 0.60 cm³; and (4): 0.70 cm³/g. Each of these were respectively crushed to approximately 8 μm, made into paste by the addition of 30% by weight sulfuric acid aqueous solution, and left for 2 weeks. The capacitance of the four types of specimens when the discharge current was 4 mA/cm² were (1): 49.6 F/cm³; (2): 51.4 F/cm³; (3): 45.7 F/cm³; and (4): 45.7 F/cm³.

As the activation yield decreased, the specific surface area and the pore volume increased, but the capacitance decreased. The capacitance was largest at 51.4 F/cm³ and smallest at 45.7 F/cm³.

Comparative Example 2
Steam Activation

Dry-distilled Charcoal B was heat-treated (15 minutes) at 900° C., and then steam activated at a temperature of 800° C. in nitrogen gas containing steam. Three types of specimen were manufactured with activation times of (1): 60 minutes (activation yield of 77.0%); (2): 90 minutes (activation yield of 68.6%); and (3): 143 minutes (activation yield of 55.1%). The specific surface areas of the three types of specimen were (1): 1120 m²/g; (2): 1380 m²/g; and (3): 1810 m²/g. In addition, the pore volumes were (1): 0.35 cm³/g; (2): 0.43 cm³/g; and (3): 0.58 cm³. Each of these were respectively crushed to approximately 8 μm, made into paste by the addition of 30% by weight sulfuric acid aqueous solution, and left for 2 weeks. The capacitance of the three types of specimens when the discharge current was 4 mA/cm² were (1): 37.8 F/cm³; (2): 34.6 F/cm³; and (3): 33.6 F/cm³.

As the activation yield decreased, the specific surface area and the pore volume increased, but the capacitance decreased. The capacitance was largest at 37.8 F/cm³ and smallest at 33.6 F/cm³. Compared with Comparative Example 1, the capacitance was smaller.

EXAMPLE 1

Dry-distilled Charcoal A was chlorinated (60 minutes) by heating to a temperature of 500° C. and running a gas mixture of 0.1 L/min chlorine in 0.9 L/min nitrogen over it. Next, the chlorine was eliminated by conducting a heat treatment for 20 minutes at a temperature of 700° C. under a current of nitrogen gas (3 L/min), and, in addition, conducting a heat treatment for 30 minutes in an oven at a temperature of 700° C. and through which nitrogen gas which had been saturated with steam at room temperature was run. When the discharge current was 4 mA/cm², the capacitance was 70.0 F/cm³.

Compared with Comparative Example 1, this capacitance was, at its greatest, 24.3 F/cm³ larger and, at its least, 18.6 F/cm³ larger (an increase of 36%~53%).

EXAMPLE 2
Dry-distilled Charcoal C, Furan Resin Char

Dry-distilled Charcoal C was chlorinated (60 minutes) by heating to a temperature of 500° C., and running a gas mixture of 0.1 L/min chlorine in 0.9 L/min nitrogen over it. Next, the chlorine was eliminated by conducting a heat treatment for 20 minutes at a temperature of 700° C. under a current of nitrogen gas (3 L/min), and, in addition, by conducting a heat treatment for 30 minutes in an oven at a temperature of 700° C. and through which nitrogen gas which had been saturated with steam at room temperature was run. When the discharge current was 4 mA/cm², the capacitance was 85.0 F/cm³.

Compared with Comparative Example 1, this capacitance was, at its greatest, 39.3 F/cm³ larger and, at its least, 33.6 F/cm³ larger (an increase of 65%~86%).

EXAMPLE 3
Effect of Temperature on Chlorination, Dry-distilled Charcoal B

Six specimens (each 15 g) of Dry-distilled Charcoal B taken as starting material were respectively chlorinated (120 minutes) by heating to a temperature of 400° C. for (1), 450° C. for (2), 500° C. for (3), 550° C. for (4), 600° C. for (5), and 650° C. for (6), and running a gas mixture of 0.1 L/min of chlorine in 1.0 L/min of nitrogen over them. Next, the chlorine was eliminated by heat-treating each of the six specimens at a temperature of 750° C. for 15 minutes under a nitrogen gas flow (3 L/min), and, additionally, heat-treating them for 15 minutes in an oven at 700° C. while running nitrogen gas containing steam through it (the concentration of steam within the oven was approximately 85% by volume). When the weights of the chlorinated dry-distilled charcoal of the six specimens were measured, based on the weight before the chlorination treatment, they had increased respectively by (1): 59.4% by weight (0.201); (2): 51.2% by weight (0.173); (3): 42.5% by weight (0.144); (4): 25.0% by weight (0.084); (5): 18.5% by weight (0.062); and (6): 12.0% by weight (0.041) (the value within the parentheses is the Cl/C atomic ratio; this is the same hereinafter). The weights after the dechlorination treatment in nitrogen gas, based on the weight before the chlorination treatment, had respectively increased by (1): 1.9% by weight (0.006); (2): 3.4% by weight (0.011); (3): 4.0% by weight (0.014); (4): 4.6% by weight (0.016); (5): 4.3% by weight (0.014); and (6): 2.8% by weight (0.009). The weights after the heat treatment in nitrogen gas containing steam, based on the weight before the chlorination treatment, were (1): 87.0% by weight; (2): 86.8% by weight; (3): 86.3% by weight; (4): 86.4% by weight; (5): 86.2% by weight; and (6): 86.1% by weight. When the discharge current was 4 mA/cm², the capacitance of the six specimens was (1): 70.0 F/cm³; (2): 71.0 F/cm³; (3): 75.2 F/cm³; (4): 79.0 F/cm³; (5): 74.5 F/cm³; and (6): 75.4 F/cm³.

Compared with the carbon dioxide gas activation treated carbonaceous material of Comparative Example 1, the capacitance of the chlorine-treated carbonaceous material of Example 3 was, at its greatest, 33.3 F/cm³ larger, and, at its least, 18.6 F/cm³ larger (an increase of 36~73%). The chlorination was effective in a wide temperature range of 400~650° C. In addition, compared with specimen (1) of Comparative Example 1, the carbon yield was also large.

EXAMPLE 4
Dry-distilled Charcoal B, Effect of Heat Treatment Temperature in Nitrogen Five specimens (each 15 g) of Dry-distilled Charcoal B taken as starting material were respectively chlorinated (120 minutes) by heating to a temperature of 550° C., and running a gas mixture of 0.1 L/min of chlorine in 1.0 L/min of nitrogen over them. Next, under a flow of nitrogen gas, the five specimens were heat-treated for 15 minutes at a temperature of 650° C. for (1), 700° C. for (2), 750° C. for (3), 800° C. for (4), and 850° C. for (5). In addition, the chlorine was eliminated by heat-treating them for 15 minutes in an oven at 700° C. while running nitrogen gas containing steam through it (the concentration of steam within the oven was approximately 85% by volume). The specific surface areas of the five specimens were (1): 780 m²/g; (2): 790 m²/g; (2): 790 m²/g; (3): 830 m²/g; and (4): 860 m²/g. In addition, the pore volumes were (1): 0.31 cm³/g; (2): 0.32 cm³/g; (3): 0.33 cm³; and (4): 0.33 cm³/g; and (5) 0.33 cm³/g. The capacitance of each of the five specimens when the discharge current was 4 mA/cm² was (1): 80.5 F/cm³; (2) 79.0 F/cm³; (3) 78.5 F/cm³; (4) 76.5 F/cm³; and (5) 75.0 F/cm³.

Compared with the carbon dioxide gas activation treated carbonaceous material of Comparative Example 1, the capacitance of the chlorine-treated carbonaceous material of Example 4 was, at its greatest, 34.8 F/cm³ greater, and, at its least, 23.6 F/cm³ greater (an increase of 46~76%). The heat treatment in nitrogen was effective over a wide temperature range of 650~850° C.

EXAMPLE 5
Dry-distilled Charcoal B, Effect of Temperature of Heating in Nitrogen Six specimens (each 15 g) of Dry-distilled Charcoal B taken as starting material were respectively chlorinated (120 minutes) by heating to a temperature of 550° C., and running a gas mixture of 0.1 L/min of chlorine in 1.0 L/min of nitrogen over them. Next, under a flow of nitrogen gas (3 L/min), the six specimens were heat-treated for 15 minutes at a temperature of 600° C. for (1), 700° C. for (2), 800° C. for (3), 900° C. for (4), 1000° C. for (5), and 1100° C. for (6). In addition, the chlorine was eliminated by heat-treating them for 15 minutes in an oven at 700° C. while running nitrogen gas containing steam through it (the concentration of steam within the oven was approximately 85% by volume). When the discharge current was 4 mA/cm², the capacitance of each of the six specimens was (1): 67.5 F/cm³; (2) 82.0 F/cm³; (3) 78.0 F/cm³; (4) 71.0 F/cm³; (5): 64.0 F/cm³; and (6): 57.5 F/cm³.

Compared with the carbon dioxide gas activation treated carbonaceous material of Comparative Example 1, the capacitance of the chlorine-treated carbonaceous material of Example 5 was, at its greatest, 36.3 F/cm³ greater, and, at its least, 6.1 F/cm³ greater (an increase of 12~79%). The heat treatment in nitrogen was effective over a wide temperature range of 600~1100° C.

EXAMPLE 6
Dry-distilled Charcoal B, Bromine Treatment

A bromination treatment was conducted on Dry-distilled Charcoal B (each 15 g), under a flow of nitrogen gas (1 L/min) containing 8% by weight bromine gas, by heating for 3 hours at a temperature of 500° C. for specimen (1); for 2 hours at a temperature of 600° C. for specimen (2); and for 1 hour at 700° C. for specimen (3). Next, a debromination treatment was conducted by heating each specimen for 30 minutes at a temperature of 800° C. under a nitrogen gas flow (3 L/min), and additionally, by heating for 15 minutes in a gas flow of nitrogen gas which had been saturated with steam at room temperature. This bromine-treated carbon was finely crushed, carbon electrodes manufactured, and the results of the measurement of the capacitance at a discharge current of 4 mA/cm² were (1): 74.3 F/cm³; (2): 70.6 F/cm³; and (3): 65.5 F/cm³.

Compared with the carbon dioxide gas activation treated carbonaceous material of Comparative Example 1, the capacitance of the bromine-treated carbonaceous material of Example 6, at its greatest, was 28.6 F/cm³, and, at its least, 14.2 F/cm³ (an increase of 28~63%). The bromination treatment was also effective.

Figure 5:
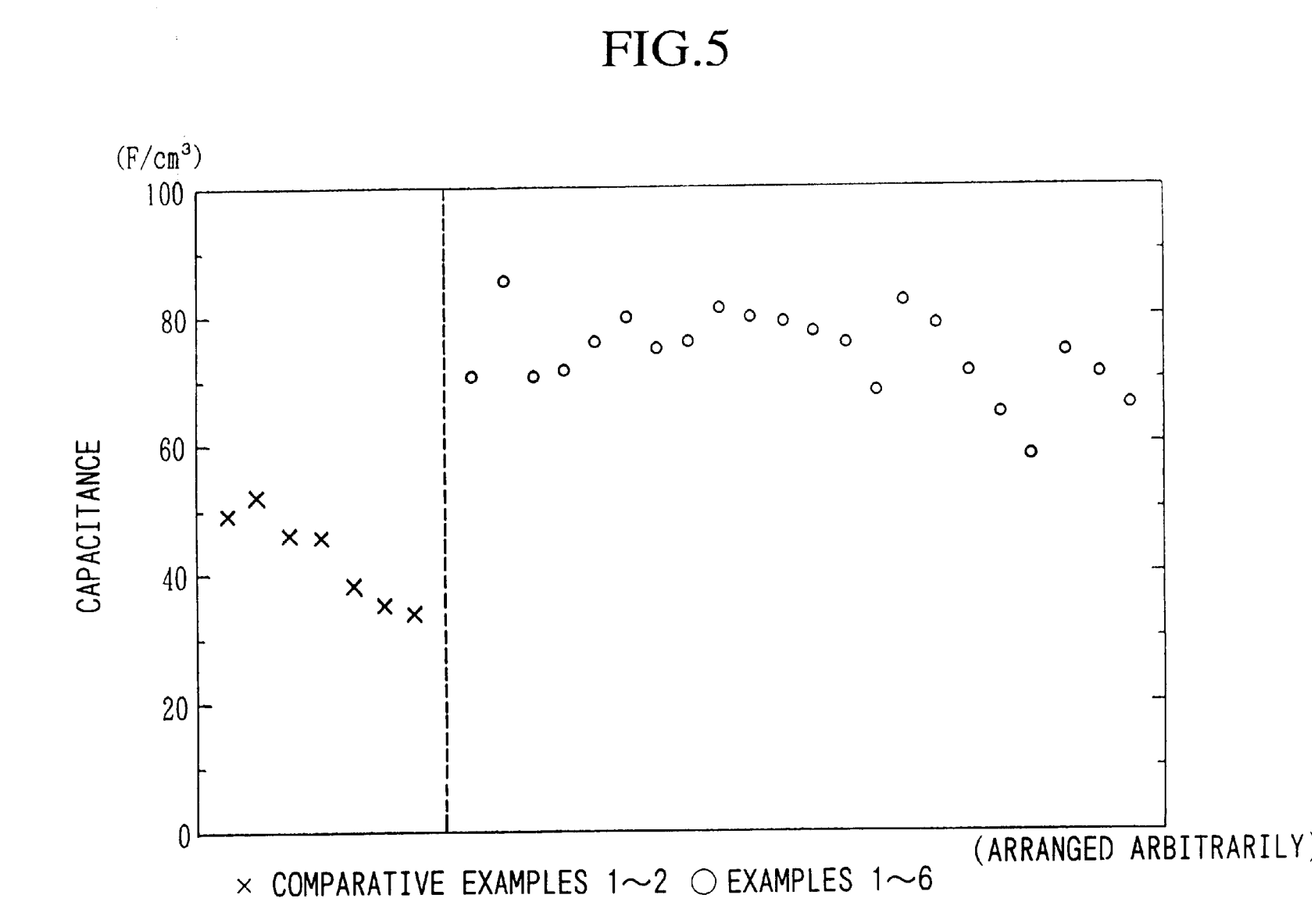
FIG. 5 is a graph which compares the capacitance of the Examples and the Comparative Examples shown in Table 2.

The results of Comparative Examples 1~2 and Examples 1~6 are shown in Table 2. In addition, a graph which compares the capacitance of these Examples and Comparative Examples is shown in FIG. 5.

TABLE 2

| | [A] | [B] | [C] m²/g | [D] cm³/g | [E] F/cm³ | [F] °C. | [G] °C. | [H] °C. | [I] °C. | [J] |
|---|---|---|---|---|---|---|---|---|---|---|
| Comparative Example 1 | B | (1) | 990 | 0.33 | 49.6 | 900 | — | — | — | CO₂, 900° C., 110 min |
| | | (2) | 1370 | 0.45 | 51.4 | 900 | — | — | — | CO₂, 900° C., 190 min |
| | | (3) | 1750 | 0.60 | 45.7 | 900 | — | — | — | CO₂, 900° C., 300 min |
| | | (4) | 1920 | 0.70 | 45.7 | 900 | — | — | — | CO₂, 900° C., 345 min |
| Comparative Example 2 | A | (1) | 1120 | 0.35 | 37.8 | 900 | — | — | — | H₂O, 800° C., 60 min |
| | | (2) | 1380 | 0.43 | 34.6 | 900 | — | — | — | H₂O, 800° C., 90 min |
| | | (3) | 1810 | 0.58 | 33.6 | 900 | — | — | — | H₂O, 800°0 C., 145 min |
| Example 1 | A | | | | 70.0 | 600 | 500 | 700 | 700 | |
| Example 2 | C | | | | 85.0 | 550 | 500 | 700 | 700 | |
| Example 3 | B | (1) | | | 70.0 | 600 | 400 | 750 | 700 | |
| | | (2) | | | 71.0 | 600 | 450 | 750 | 700 | |
| | | (3) | | | 75.2 | 600 | 500 | 750 | 700 | |
| | | (4) | | | 79.0 | 600 | 550 | 750 | 700 | |
| | | (5) | | | 74.5 | 600 | 600 | 750 | 700 | |
| | | (6) | | | 75.4 | 600 | 650 | 750 | 700 | |
| Example 4 | B | (1) | 780 | 0.31 | 80.5 | 600 | 550 | 650 | 700 | |
| | | (2) | 790 | 0.32 | 79.0 | 600 | 550 | 700 | 700 | |

TABLE 2-continued

|  | [A] | [B] | [C] m²/g | [D] cm³/g | [E] F/cm³ | [F] °C. | [G] °C. | [H] °C. | [I] °C. | [J] |
|---|---|---|---|---|---|---|---|---|---|---|
|  |  | (3) | 790 | 0.33 | 78.5 | 600 | 550 | 750 | 700 |  |
|  |  | (4) | 830 | 0.33 | 76.5 | 600 | 550 | 800 | 700 |  |
|  |  | (5) | 860 | 0.33 | 75.0 | 600 | 550 | 850 | 700 |  |
| Example 5 | B | (1) |  |  | 67.5 | 600 | 550 | 600 | 700 |  |
|  |  | (2) |  |  | 82.0 | 600 | 550 | 700 | 700 |  |
|  |  | (3) |  |  | 78.0 | 600 | 550 | 800 | 700 |  |
|  |  | (4) |  |  | 71.0 | 600 | 550 | 900 | 700 |  |
|  |  | (5) |  |  | 64.0 | 600 | 550 | 1000 | 700 |  |
|  |  | (6) |  |  | 57.5 | 600 | 550 | 1100 | 700 |  |
| Example 6 | B | (1) |  |  | 74.3 | 600 | 500 | 800 | 700 |  |
|  |  | (2) |  |  | 70.6 | 600 | 600 | 800 | 700 |  |
|  |  | (3) |  |  | 65.6 | 600 | 700 | 800 | 700 |  |

[A] Type of Dry-distilled Charcoal
[B] Specimen Number
[C] Specific Surface Area m²/g
[D] Pore Volume cm³/g
[E] Capacitance F/cm³
[F] Heating Temperature for Comparative Examples, Dry-distillation Temperature for Examples °C.
[G] Temperature of Chlorination or Bromination ° C.
[H] Temperature of the High Temperature Dechlorination or High Temperature Debromination ° C.
[I] Temperature of the Low Temperature Dechlorination or High Temperature Debromination ° C.
[J] Other (Conditions of the Activation of the Comparative Examples)

Comparative Example 3
No Chlorine Treatment, Molding

Dry-distilled Charcoal B which had been dry-distilled again at 700° C. was used as the dry-distilled charcoal starting material. The dry-distilled charcoal was crushed, molded by the addition of a binding agent, and then given a carbonization treatment. The carbonization treatment was conducted by heating at an increasing temperature rate of 100° C./h, and then maintained for 30 minutes at a temperature of 600° C. for specimen (1), 800° C. for specimen (2), 1000° C. for specimen (3), and 1200° C. for specimen (4). The shape of the obtained molded carbonaceous material was excellent. The capacitance of the electrodes manufactured from these molded carbonaceous material specimens was measured and the results when the discharge current was 300 mA/cm² were (1): 9.5 F/cm³; (2): 21.4 F/cm³; (3): 19.5 F/cm³; and (4): 11.8 F/cm³.

EXAMPLE 7
Chlorine Treatment, Powdered Product

Dry-distilled Charcoal B which had been dry-distilled again at 700° C. was used as the dry-distilled charcoal starting material. Following the manufacturing process of FIG. 1, a chlorination treatment was conducted on 15 g of dry-distilled charcoal by heating for 60 minutes at a temperature of 600° C. under a nitrogen gas flow (1 L/min) which contained chlorine gas at 10% by volume. Next, the temperature of the heating under nitrogen gas (3 L/min) was 600° C. for specimen (1), 800° C. for specimen (2), 1000° C. for specimen (3), and 1100° C. for specimen (4). In addition, a dechlorination treatment was conducted by heating for 15 minutes in an oven at a temperature of 700° C., and through which nitrogen gas which had been saturated with steam at room temperature was being run. These carbonaceous materials were crushed, and electrodes were manufactured following the above-mentioned method. However, in this Example, the shape of the electrode was 14 mm in diameter and 1 mm in thickness. The capacitance was measured and the results, when the discharge current was 300 mA/cm², were (1): 22.5 F/cm³; (2): 26.5 F/cm³; (3): 25.5 F/cm³; and (4): 22.4 F/cm³.

EXAMPLE 8
Molding; Chlorine Treatment, Effect of Temperature of Chlorination Treatment Dry-distilled Charcoal B which had been dry-distilled again at 700° C. was used as the dry-distilled charcoal starting material. Following the manufacturing process of FIG. 2, a molding treatment was conducted by crushing the dry-distilled charcoal and adding a binding agent. The carbonization treatment was conducted under a nitrogen gas flow (1 L/min) by heating at a rate of 100° C./h, and then maintaining at a temperature of 700° C. for 30 minutes. A chlorination treatment was conducted on this carbonization-treated molded article by heating it at a temperature of 500° C. for specimen (1), 600° C. for specimen (2), 7000° C. for specimen (3), and 800° C. for specimen (4), for 60 minutes under a flow of nitrogen gas (1 L/min) containing chlorine gas at 10% by volume. Next, a dechlorination treatment was conducted by heating for 30 minutes at 900° C. under a nitrogen gas flow (1 L/min), and, in addition, heating in an oven at a temperature of 700° C. through which nitrogen gas which had been saturated with steam at room temperature was being run. The molded article had an excellent shape. Electrodes were manufactured from these, the capacitance was measured, and the results, when the discharge current was 300 mA/cm², were (1): 38.0 F/cm³; (2): 36.5 F/cm³; (3): 35.0 F/cm³; and (4): 32.5 F/cm³.

Moreover, when the rate of temperature increase in the carbonization treatment was 550° C./h, the molded article changed shape, cracks developed, and so on. When the rate of temperature increase was 500° C./h or less, excellent shape was obtained.

EXAMPLE 9
Molding, Chlorine Treatment, Effect of Heating Temperature Under Nitrogen Gas Flow Dry-distilled Charcoal B which had been dry-distilled again at 700° C. was used as the dry-distilled charcoal starting material. Following the manufacturing process of FIG. 2, a molding treatment was conducted by crushing the dry-distilled charcoal and adding a binding agent. A carbonization treatment was conducted under a nitrogen gas flow (1 L/min) by heating at a rate of 200° C./h, and then maintaining at a temperature of 700° C. for 40 minutes. A chlorination treatment was conducted on this carbonization-treated molded article by heating it at a temperature of 600° C. for 60 minutes under a flow of nitrogen gas (1 L/min) containing chlorine gas at 10% by volume. Next, a dechlorination treatment was conducted by heating under a nitrogen gas flow (1 L/min) for 30 minutes at a temperature of 600° C. for specimen (1), 800° C. for specimen (2), 1000° C. for specimen (3), and 1100° C. for specimen (4), and, in addition, heating for 15 minutes in an oven at a temperature of 700° C. through which nitrogen gas which had been saturated with steam at room temperature was being run. The molded article had an excellent shape. Electrodes were manufactured from these and the capacitance was measured. The results when the discharge current was 300 mA/cm$^2$ were (1): 30.5 F/cm$^3$; (2): 39.0 F/cm$^3$; (3): 33.6 F/cm$^3$; and (4): 30.6 F/cm$^3$.

EXAMPLE 10
Dry-distilled Charcoal B, Molding, Bromination Treatment

Dry-distilled Charcoal B which had been dry-distilled again at 700° C. was used as the Dry-distilled charcoal starting material. Molding was conducted by finely crushing Dry-distilled Charcoal B and adding a binding agent. A carbonization treatment was conducted on the molded product under a nitrogen gas flow (1 L/min) by heating while increasing the temperature at a rate of 100° C./h, and then maintaining at a temperature of 700° C. for 30 minutes. Next, a bromination treatment was conducted by heating for 60 minutes at a temperature of 500° C. for specimen (1), 700° C. for specimen (2), 500° C. for specimen (3), and 500° C. for specimen (4), under a flow of nitrogen gas (1 L/min) containing bromine gas at 8% by weight. Next, they were heated under a nitrogen gas flow (1 L/min) at a temperature of 850° C. for specimen (1), 850° C. for specimen (2), 750° C. for specimen (3), and 1100° C. for specimen (4). In addition, a debromination treatment was conducted by heating for 15 minutes in an oven at a temperature of 700° C. through which nitrogen gas which had been saturated with steam at room temperature was being run. The molded article had an excellent shape. Electrodes were manufactured from these, the capacitance was measured, and the results when the discharge current was 300 mA/cm$^2$ were (1): 39.0 F/cm$^3$; (2): 34.4 F/cm$^3$; (3): 38.2 F/cm$^3$; and (4): 30.3 F/cm$^3$.

EXAMPLE 11
Dry-distilled Charcoal C, Molding

Molding was conducted by crushing Dry-distilled Charcoal C and adding a binding agent. Following the process of FIG. 2, a carbonization treatment was conducted under a nitrogen gas flow (1 L/min) by increasing the temperature at a rate of 200° C./h to 550° C., and then maintaining it at a temperature of 550° C. for 30 minutes. A chlorination treatment was conducted by heating this carbonization-treated molded article at a temperature of 650° C. for specimen (1), 800° C. for specimen (2), 550° C. for specimen (3), and 550° C. for specimen (4), for 60 minutes under a flow of nitrogen gas (1 L/min) containing chlorine gas at 10% by volume. Next, a dechlorination treatment was conducted by heating at a temperature of 950° C. for specimen (1), 950° C. for specimen (2), 850° C. for specimen (3), and 1050° C. for specimen (4), for 30 minutes under a nitrogen gas flow (1 L/min), and, in addition, heating for 20 minutes in an oven at a temperature of 690° C. through which nitrogen gas which had been saturated with steam at room temperature was being run. Electrodes were manufactured from the four specimens, the capacitance was measured, and the results, when the discharge current was 300 mA/cm$^2$, were (1): 35.4 F/cm$^3$; (2): 30.5 F/cm$^3$; (3): 38.5 F/cm$^3$; and (4): 30.7 F/cm$^3$.

EXAMPLE 12
Dry-distilled Charcoal A; Molding

Molding was conducted by finely crushing Dry-distilled Charcoal A and adding a binding agent. A carbonization treatment was conducted under a nitrogen gas flow (1 L/min) by heating while increasing the temperature at a rate of 150° C./h, and then maintaining it at a temperature of 600° C. for 30 minutes. A chlorination treatment was conducted by heating for 60 minutes at a temperature of 600° C. for specimens (1) and (2), and 700° C. for specimen (3) under a flow of nitrogen gas (1 L/min) containing chlorine gas at 10% by volume. Next, a dechlorination treatment was conducted by heating at a temperature of 800° C. for specimen (1), and 1100° C. for specimens (2) and (3) under a nitrogen gas flow (1 L/min), and, in addition, heating for 15 minutes in an oven at a temperature of 700° C. through which nitrogen gas which had been saturated with steam at room temperature was being run.

The shape of the obtained molded articles were excellent. Electrodes were manufactured from these, the capacitance was measured, and the results, when the discharge current was 300 mA/cm$^2$, were (1): 34.2 F/cm$^3$; (2): 31.2 F/cm$^3$; and (3): 30.8 F/cm$^3$.

EXAMPLE 13
Dry-distilled Charcoal D, Molding

Molding was conducted by crushing Dry-distilled Charcoal D and adding a binding agent. A carbonization treatment was conducted under a nitrogen gas flow (1 L/min) by heating while increasing the temperature at a rate of 100° C./h, and then maintaining at a temperature of 600° C. for 30 minutes. A chlorination treatment was conducted by heating the carbonized molded article for 60 minutes at a temperature of 650° C. under a flow of nitrogen gas (1 L/min) containing chlorine gas at 10% by volume. Next, a dechlorination treatment was conducted by heating at a temperature of 700° C. for specimen (1) and 1050° C. for specimen (2) under a nitrogen gas flow (1 L/min), and, in addition, heating in an oven through which nitrogen gas which had been saturated with steam at room temperature was being run. Electrodes were manufactured from this, the capacitance was measured, and the results, when the discharge current was 300 mA/cm$^2$, were (1): 35.7 F/cm$^3$ and (2): 32.8 F/cm$^3$.

Figure 6:
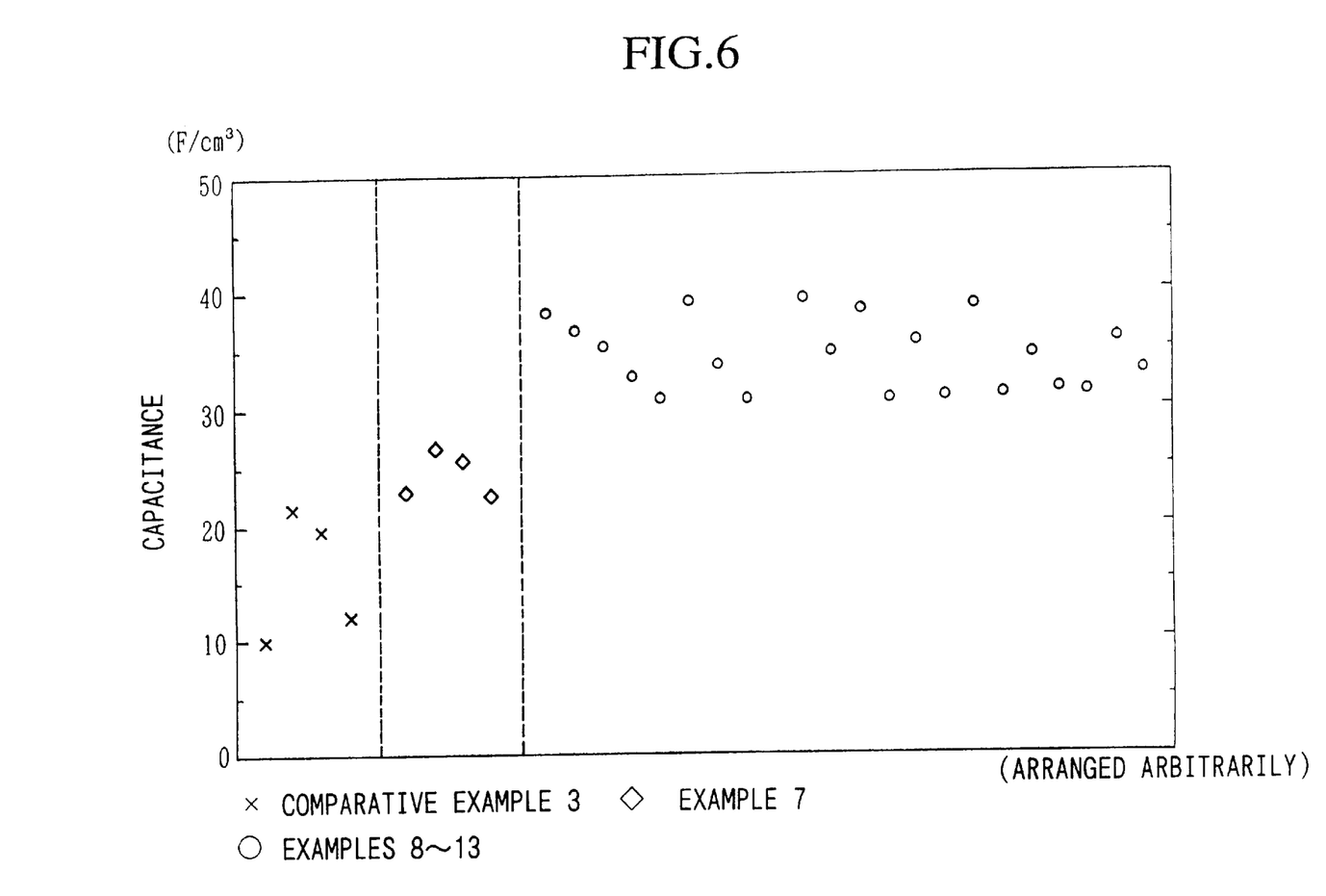
FIG. 6 is a graph which compares the capacitance of the Examples and the Comparative Examples shown in Table 3.

The results for Comparative Example 3 and Examples 7 to 13 are shown in Table 3. In addition, a graph comparing the capacitance of these Examples and Comparative Examples is shown in FIG. 6.

TABLE 3

| | [A] | [B] | [C] °C. | [D] °C. | [E] F/cm$^3$ |
|---|---|---|---|---|---|
| Comparative Example 3 | B | (1) | none | 600 | 9.5 |
| | | (2) | none | 800 | 21.4 |
| | | (3) | none | 1000 | 19.5 |
| | | (4) | none | 1100 | 11.8 |
| Example 7 | B | (1) | 600 | 600 | 22.5 |
| | | (2) | 800 | 800 | 26.5 |
| | | (3) | 600 | 1000 | 25.5 |
| | | (4) | 600 | 1100 | 22.4 |
| Example 8 | B | (1) | 500 | 900 | 38.0 |
| | | (2) | 600 | 900 | 36.5 |
| | | (3) | 700 | 900 | 35.0 |
| | | (4) | 800 | 900 | 32.5 |
| Example 9 | B | (1) | 600 | 600 | 30.5 |
| | | (2) | 600 | 800 | 39.0 |
| | | (3) | 600 | 1000 | 33.6 |
| | | (4) | 600 | 1100 | 30.6 |

TABLE 3-continued

|  | [A] | [B] | [C] °C. | [D] °C. | [E] F/cm³ |
|---|---|---|---|---|---|
| Example 10 | B | (1) | 500 | 850 | 39.0 |
|  |  | (2) | 700 | 850 | 34.4 |
|  |  | (3) | 500 | 750 | 38.2 |
|  |  | (4) | 500 | 1100 | 30.3 |
| Example 11 | C | (1) | 650 | 950 | 35.4 |
|  |  | (2) | 800 | 950 | 30.5 |
|  |  | (3) | 550 | 850 | 38.5 |
|  |  | (4) | 550 | 1050 | 30.7 |
| Example 12 | A | (1) | 600 | 800 | 34.2 |
|  |  | (2) | 600 | 1100 | 31.2 |
|  |  | (3) | 700 | 1100 | 30.8 |
| Example 13 | D | (1) | 650 | 700 | 35.7 |
|  |  | (2) | 650 | 1050 | 32.8 |

[A]Type of Dry-distilled Charcoal
[B]Specimen Number
[C]Temperature of Halogen Treatment
[D]Heating Under Nitrogen Gas Flow
[E]Capacitance As is clear from Table 3, the capacitance of a carbonaceous material obtained by conducting a carbonization treatment on a dry-distilled charcoal which had been crushed, had a binding agent added, and molded (Comparative Example 3) was 9.5~21.4 F/cm³. When a dry-distilled charcoal was given a chlorination treatment and then crushed and made into a paste (Example 7), the capacitance was 22.4~26.5 F/cm³; and, compared with Comparative Example 3, the capacitance was, at its greatest, 17.0 F/cm³ larger and, at its least, 2.0 F/cm³ larger. This is an increase of 9~178%. In addition, the capacitance of a carbonaceous material which had been molded, carbonization-treated, and then been given a halogenation treatment (Examples 8~13) was 30.3~39.0 F/cm³, and, compared with Comparative Example 3, the capacitance was, at its greatest, 29.5 F/cm³ larger and, at its least, 8.9 F/cm³ larger. This was an increase of 43~410%.

Industrial Applicability

As explained in the above, a carbonaceous material which is suitable for carbon electrodes of electrical double layer capacitors and having excellent capacitance can be obtained by means of conducting a halogenation treatment followed by a dehalogenation treatment on a dry-distilled charcoal in accordance with the present invention. Furthermore, by means of the manufacturing method for carbon electrodes for electrical double layer capacitors of the present invention, since the carbon loss is small, it is possible to manufacture the carbonaceous material for electrical double layer capacitors at a high yield.

In addition, it is possible to obtain carbonaceous material for electrical double layer capacitors, which has a large capacitance at rapid discharge and excellent shape, by means of conducting a halogen treatment on a carbonized molded article obtained by conducting a carbonization treatment on a dry-distilled charcoal which has been molded by crushing and the addition of a binding agent in accordance with the present invention.

We claim:

1. A method comprising:
   chlorinating carbonaceous material obtained from a heat treated carbonaceous material precursor with chlorine gas thereby forming a chlorinated carbon wherein unorganized carbon has reacted with chlorine; and
   dechlorinating said chlorinated carbon, wherein a part or all of said chlorine in said chlorinated carbon is eliminated.

2. The method according to claim 1, wherein said chlorinating is a heat treatment conducted at a temperature of from 350 to 1000° C. in chlorine gas diluted with an inert gas.

3. The method according to claim 1, wherein said dechlorinating is a heat treatment conducted at a temperature of from 500 to 1200° C. under vacuum evacuation.

4. The method according to claim 1, wherein said dechlorinating is a heat treatment conducted at a temperature of from 500 to 1200° C. in an inert gas.

5. The method according to claim 1, wherein said carbonaceous material precursor is at least one substance selected from the group consisting of coconut shell, phenol resin, furan resin, and vinylidene chloride resin.

6. The method according to claim 1, wherein said dechlorinating is a heat treatment conducted at a temperature of from 600 to 850° C. in a hydrogen compound gas diluted with an inert gas.

7. The method according to claim 6, wherein said hydrogen compound is at least one compound selected from the group consisting of water and lower hydrocarbons.

8. The method according to claim 1, comprising before said chlorinating,
   molding a crushed mixture of said carbon obtained from a heat-treated carbonaceous material precursor and a binding agent to form a molded article; and
   carbonizing by heating said molded article in an inert gas atmosphere.

9. The method according to claim 8, wherein said binding agent is a composition comprising phenol resin powder, organic solvent, and lipophilic solvent.

10. The method according to claim 8, wherein said carbonizing comprises raising the temperature at a rate of 20–500° C./h, and heating is conducted at about 400–100° C.

* * * * *

UNITED STATES PATENT AND TRADEMARK OFFICE
CERTIFICATE OF CORRECTION

PATENT NO. : 5,948,329
DATED : September 7, 1999
INVENTOR(S) : Takushi Ohsaki, et al.

It is certified that error appears in the above-identified patent and that said Letters Patent is hereby corrected as shown below:

<u>Title page,</u>
Item [22] should be: -- [22]   PCT filed: Apr. 26, 1996 --

Signed and Sealed this

Ninth Day of October, 2001

*Attest:*

NICHOLAS P. GODICI
*Attesting Officer*     *Acting Director of the United States Patent and Trademark Office*